RECTILINEAR GUIDE MECHANISM FOR PHONOGRAPH PICKUP ARMS

Filed Feb. 11, 1959 2 Sheets-Sheet 1

INVENTOR:
DOMINICK S. TOMASELLI

BY Robert Brown, Jr.
ATTORNEY

Aug. 9, 1960 D. S. TOMASELLI 2,948,538

RECTILINEAR GUIDE MECHANISM FOR PHONOGRAPH PICKUP ARMS

Filed Feb. 11, 1959 2 Sheets-Sheet 2

INVENTOR:
DOMINICK S. TOMASELLI

BY Robert Brown, Jr.
ATTORNEY 2,948,538
Patented Aug. 9, 1960

2,948,538

RECTILINEAR GUIDE MECHANISM FOR PHONOGRAPH PICKUP ARMS

Dominick S. Tomaselli, 227 E. 17th St., Huntington Station, N.Y.

Filed Feb. 11, 1959, Ser. No. 792,602
9 Claims. (Cl. 274—23)

This invention relates to a pickup assembly for sound reproducing systems and more particularly to devices of this character adapted to operate in conjunction with disk records and which have means for maintaining the stylus in a tangential position with respect to the sound groove during the movement of the pickup arm across the record.

Disk phonograph records are made by cutting a spiraled sound groove from the outer edge toward the center of the disk. During the cutting operation the cutter moves substantially radially across the record, and the groove undulates horizontally from side to side of the mean path to produce modulation. On playback equipment, the stylus is wedged into the sound groove by vertical force, which force is produced at least in part by the weight of a portion of the pickup arm.

Heretofore, various mechanisms have been provided for guiding the pickup arm and stylus across the record during reproduction. In one of the most common types of such mechanisms, the pickup arm is pivoted about a fixed vertical axis and the stylus, located at the free end of the arm, is caused to follow an arcuate path across the record. Thus, the angle between the longitudinal axis of the pickup arm and the tangent to the unmodulated groove changes as the stylus and arm swing laterally across the record. This variable angularity and resultant lateral component of force exerted against the stylus causes distortion of sound, and further tends to force the stylus out of the groove.

Other types of conventional guide mechanisms comprise substantially radially travelling arms in which the guide mechanism is placed above the record. Such construction requires a two-step operation to clear the space above the turntable for removal or replacement of a record, said operation consisting of first lifting the pickup from the record and then rotating the guide mechanism and pickup to a nonobstructing position.

It is an object of this invention to provide a mechanism laterally offset from the turntable and adapted to guide the pickup and the associated stylus with the latter tangentially disposed with respect to the spiraled sound groove while the record is being played. Such an arrangement will result in the lowering of distortion and the elimination of forces which tend to remove the stylus from the groove; and will further facilitate record changing, making possible a one-step operation comprising the lifting of the pickup and returning it to rest in a position laterally offset from the turntable.

It is another object of this invention to provide a guide mechanism as above described, having adjustable counterweight means for varying the pressure exerted by the stylus upon the sound groove, thereby diminishing the wear on both the stylus and record.

It is another object of this invention to provide a guide mechanism for pickup assemblies of the class described, comprising a single stationary track having antifriction members thereon rollably supporting an intermediate portion of the pickup arm to guide the movement of said arm in a rectilinear path, and to also pivotally support the arm for rotation about a horizontal axis. The antifriction members cooperate with the above-mentioned counterweight means to reduce the drag and thus allow the guide and pickup arm to be moved during a playing operation solely by the motivating force produced by the spiraled groove upon the stylus. Without antifriction means and the counterweight the drag might be excessive and cause the stylus to move from the groove.

It is still another object of this invention to provide a guide mechanism of the class described in which self-aligning means are present for yieldably resisting the movement of the stylus from its mean path of travel in the groove. This feature causes the stylus to follow substantially a rectilinear path across the record and to restore the stylus to mean position upon deviation.

Some of the objects of the invention having been stated, other objects will appear as the description proceeds when taken in connection with the accompanying drawings, in which.

Figure 1:
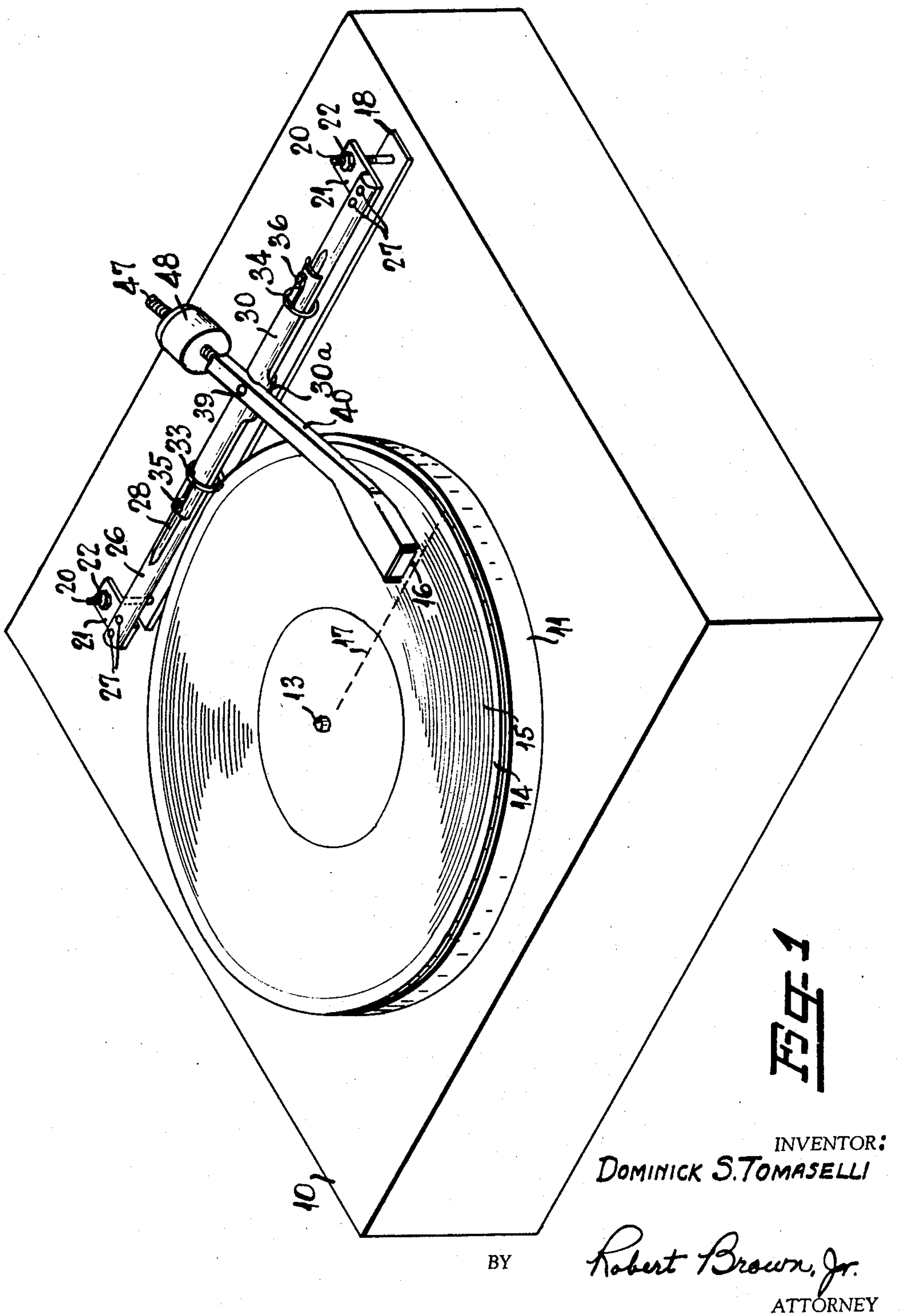
Figure 1 is an isometric view showing a phonograph equipped with the present invention.

Referring more specifically to the drawings, the numeral 10 denotes the chassis of a sound reproducing device, such as a phonograph having turntable 11 rotatably mounted thereon as at 12. The upper central portion of the turntable has a spindle 13 extending upwardly along the axis of rotation for removably receiving a disk record 14, said record having a sound groove 15 cut spirally from the outer edge of the record toward the center. A stylus or needle 16 engages the groove during a playing operation.

The improved stylus guiding mechanism herein disclosed is adapted to cause the stylus 16 to remain positioned tangentially to the spiraled groove as the sound recorded on the disk is reproduced. Therefore, the stylus must be positioned during such period along a radial line normal to the tangent and at the point of tangency. The sum of the succeeding positions of the needle at the end of the revolutions of the disk define a rectilinear path indicated by dotted line 17 (Fig. 1). Line 17 is not exactly parallel to the radii of the turntable and disk, but there is substantial parallelism. The slight lack of parallelism is obvious since a line normal to the tangent of the spiraled groove 15 at any point will diverge from the turntable and disk radii. Hence, the term "substantially parallel to the disk radius" as later used is to be interpreted to include a line defined by the tangential points engaged by the stylus at the completion of successive revolutions of the disk.

Figures 2, 3, 4, 5, 6, 7:
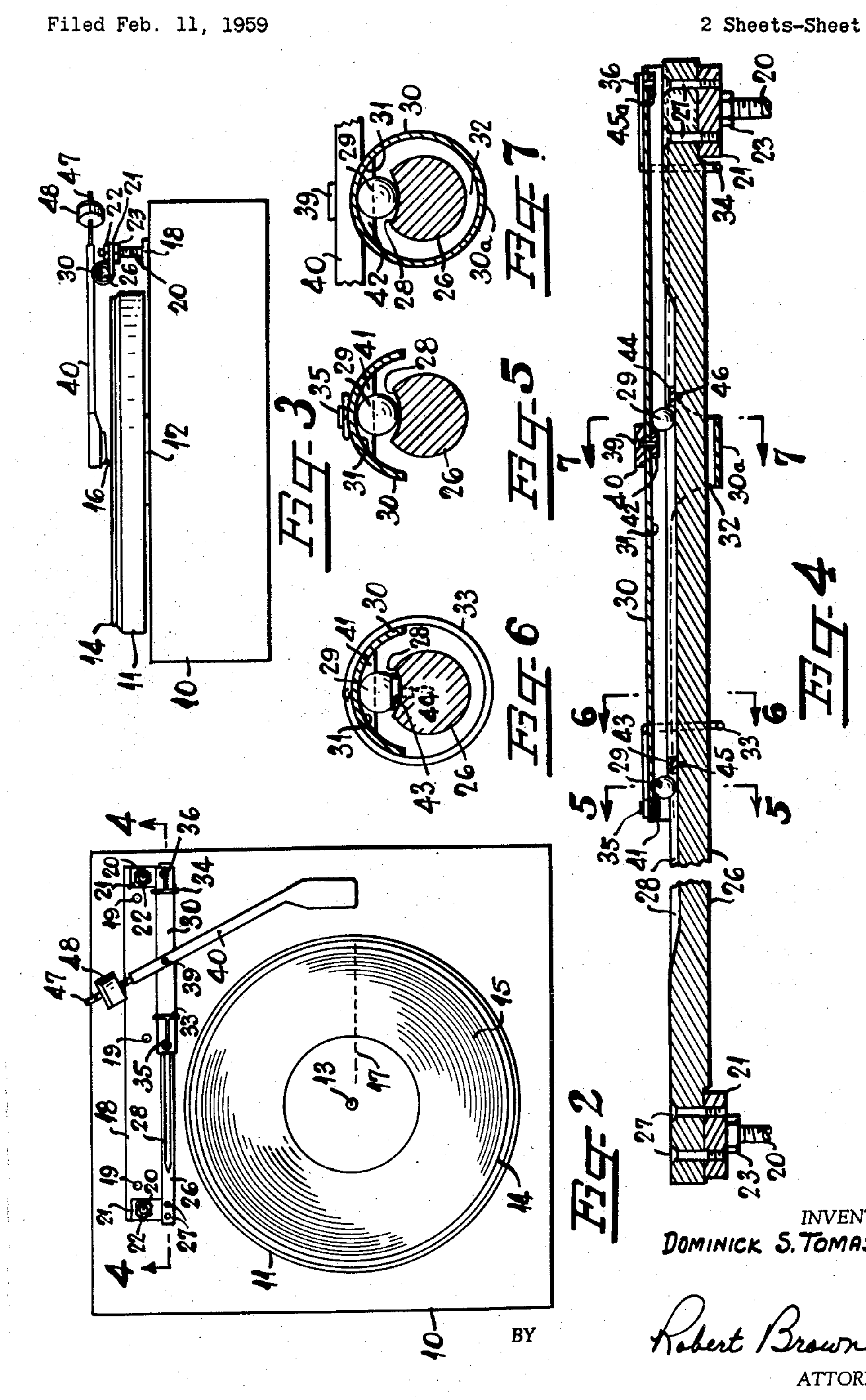
Figure 2 is a plan view, similar to Figure 1, showing the improved guide mechanism for the stylus.
Figure 3 is a vertical elevational view looking at the right-hand side of Figure 2.
Figure 4 is a sectional detail view through the guide mechanism and taken along line 4—4 in Figure 2.
Figure 5 is a sectional detail view taken along line 5—5 in Figure 4.
Figure 6 is a sectional detail view taken along line 6—6 in Figure 4.
Figure 7 is a sectional detail view taken along line 7—7 in Figure 4.

The stylus guiding mechanism comprises a bar 18 secured to chassis 10 by suitable means such as screws 19 (Fig. 2). Extending upwardly from the ends of bar 18 are spaced threaded bolts 20 having plates 21 adjustably mounted thereon by means of nuts 22 and 23 disposed above and below each of the plates respectively. Secured to these plates are the ends of a stationary track member 26 by means of screws 27, said track member having a longitudinally disposed groove 28 in its upper surface for the reception of spaced antifriction members or balls 29. By adjusting nuts 22 and 23, the plates 21 and fixed track 26 can be positioned correctly with respect to the top of the turntable. This adjustment facilitates gravity feed to be later described.

It will be noted by observing Figures 5, 6 and 7 that the radius of the groove 28 is greater than that of balls 29, thereby permitting limited rolling movement of the balls and the parts carried thereby transversely of the stationary track 26, but normally tending to restore the balls and supported parts to normal position.

A movable slide 30 is disposed above and parallel to fixed track 26, said slide being provided with a longitudinally disposed groove in its lower face disposed opposite and parallel to groove 28 in the fixed track. The antifriction members or balls 29 which rest in groove 28, have their upper peripheries confined in groove 31 to thereby rollably support slide 30 for movement longitudinally of track 26. Groove 31, like the opposed groove 28, has a greater radius than that of balls 29 so that limited movement of the slide will be permitted in a direction transversely of the fixed track, but with gravitational force at all times tending to restore the parts to normal position.

Slide 30 encircles track 26 as at 30*a*, leaving a suitable celarance 32 (Figs. 4 and 7) sufficient to allow normal movement of the slide, but without allowing the balls 29 to escape from the grooves. For substantially the same purpose, wire loops 33 and 34 encircle the end portions of track 26 and are secured to the ends of slide as at 35 and 36, respectively. Rigidly secured to movable slide 30 as at 39 is pickup arm 40 having the previously mentioned stylus 16 mounted in the free end thereof.

From the above-described structure, it can be observed that the balls or antifriction members 29 and the arcuate grooves 28 and 31 are so constructed and arranged as to permit limited three-dimensional movement of the stylus 16. More particularly, the stylus can move: (*a*) slightly forwardly or rearwardly along a line substantially tangent to the groove 15 while the groove 31 rolls transversely on balls 29, (*b*) along a line parallel to grooves 28 and 31 as the groove 31 and slide 30 roll longitudinally on balls 29, and (*c*) in a vertical direction as the arm 40 rolls on balls 29 as a pivot. Combinations of these individual movements take place during operation, as for example, the rotation of stylus 16 in a horizontal plane as the groove 31 rolls on balls 29.

In order to limit movement of movable slide 30 and of arm 40 away from the turntable, or to the right in Figures 1, 2 and 4, stops 41 and 42 are secured in upper groove 31 as at 35 and 39 respectively, and a second pair of stops 43 and 44 are secured in the bottom groove 28 as at 45 and 46 respectively (Fig. 4). These stops are engaged by rolling members 29 at their limit of outward travel. In its extreme outward position, the slide, balls and pickup arm occupy the position shown in Figures 2 and 4, at which time the pickup arm 40, as well as its supporting structure designated by reference characters 18 through 39, is offset laterally of turntable 11 to thereby provide vertical clearance above the turntable for removal or replacement of a disk record 14. The movement of slide 30 and pickup arm 40 inwardly toward the turntable, or to the left in Figures 1, 2 and 4, is limited by stop 43, secured in lower groove 28 as at 44, and also limtied by stop 45*a* secured in upper groove 31 as at 36. Stops 43 and 45*a* engage a ball 29 at the limit of inward travel of the slide.

It will be observed from Figure 4 that the projections 41 and 42 on the upper movable track 30, and the projections 43 and 44 on the lower fixed track 26, jointly serve as a means for restoring the balls to their correct spaced positions relative to one another when the pickup arm is moved to its laterally offset rest position. Specifically, the projections 41 and 42 on the upper track are spaced apart the same distance as the correct ball spacing, and the projections 43 and 44 on the fixed track are also spaced apart the same spacing as the correct spacing of the balls but are located respectively on opposite sides of the balls. Once positioned, the balls do not change spacing under normal use, but in the event the balls should become improperly spaced, the proper spacing may be restored by returning the arm to rest position as shown in Figure 4. This ball spacing corrective mechanism eliminates the use of a conventional ball retainer which, in the present instance, would produce objectionable friction and lessen the sensitivity of the device.

It is thus seen that as the turntable 11 and disk 14 rotate with stylus 16 engaging sound groove 15, the pickup arm 40 and its associated movable guiding mechanism, will be moved inwardly, solely as a result of the lateral force exerted by the stylus upon the sound groove. The grooves 28 and 31 are parallel to straight line 17 which, as heretofore stated, is defined by the points of tangency engaged by the stylus upon the completion of successive revolutions of the sound groove. Therefore, the stylus will be caused to follow a rectilinear course as it remains in a tangential position.

To allow gravity feed and thus further reduce the drag, means are provided for varying the weight exerted by the pickup arm 40 and stylus 16 upon the sound groove 15. Specifically, the weight varying means comprises a threaded extension 47 of pickup arm 40, upon which a counterweight 48 is threadably mounted. By varying the distance of counterweight 48 from point 39 on the arm supporting slide 30, the amount of pressure exerted by the stylus upon the sound groove can be regulated so as to obtain optimum operating results. The drag should be reduced to such an extent that it can be easily overcome by the lateral force exerted upon the stylus by the sound groove, but not eliminated to such an extent that the stylus will not properly engage the groove. It is highly important to reduce excessive drag, however, since the lateral force exerted by the groove upon the stylus is the sole motivating force for moving arm 40 and its associated movable structure in a rectilinear path.

As a further adjustment to reduce drag and facilitate gravity feed, the previously described nuts 22 and 23 may be adjusted on bolts 20 to position the guide mechanism at the correct height relative to the top surface of the turntable.

Although the rectilinear guide mechanism herein disclosed is illustrated in conjunction with a manually operated phonograph, it is to be understood that it may also be installed on automatic machines. Furthermore, this invention may be mounted on conventional phonographs by using conventional fastening means such as screws; or if desired, upon changer phonographs to permit manual operation.

In the drawings and specification preferred embodiments of the invention have been shown, and although specific terms have been employed they are not intended for purposes of limitation, the scope of the invention being set forth in the following claims:

I claim:

1. In a sound reproducing system having a turntable and a pickup arm, and a stylus at the free end of said arm for engaging the sound groove in a disk record mounted on the turntable, guide means for said stylus comprising, a fixed member having a horizontally disposed rectilinear groove in its upper surface, a movable member having an elongated groove therein, said rectilinear groove being oppositely disposed and parallel to said elongated groove, each of said two last-named grooves being arcuate in cross section and substantially parallel to the radii of the disk and turntable, spaced balls fitting in said grooves to rollably support said movable member, each of said balls having a radius smaller than the radii of said oppositely disposed grooves, and means for fixedly attaching said arm to the movable member with said stylus engageable with the disk groove substantially along said disk radius, whereby said stylus will be moved substantially radially of the disk by the rotation of the latter, and whereby said balls and oppositely disposed grooves will yieldingly resist lateral displacement of the stylus from its mean path of travel in said disk groove.

2. Stylus guiding means as defined in claim 1, and further comprising means for permitting rotation of said arm and its fixedly attached movable member about said spaced balls as an axis.

3. In a sound reproducing system having a turntable adapted to receive a concentrically mounted disk record with a sound groove therein, and also having an elongated pickup arm with a stylus at its free end for engaging said groove substantially along a radius of said record as the latter is rotated, an improved mechanism for bodily guiding said arm and stylus inwardly along said radius comprising: a fixed track having a groove in its upper portion extending parallel to said radius and transversely of said arm, a plurality of spaced balls having the lower portions thereof rollable longitudinally in said track groove, a second elongated track having a groove in its lower portion parallel to said first track groove and extending transversely of said arm, the upper portions of said balls being rollable longitudinally in said second track groove, said balls being held in spaced relation solely by their rolling contact with the respective track grooves, whereby said second track is mounted for movement on said first track along an axis parallel to said radius, and means rigidly securing said second track to said transverse arm at a point longitudinally spaced from said stylus, and cam means rollably engageable by said balls upon deviation of said second track from said axis of movement for restoring the latter to said axis, whereby lateral deviation of the stylus from its mean path of travel in the sound groove is yieldably resisted.

4. In a sound reproducing system having a turntable adapted to receive a concentrically mounted record with a sound groove therein, and also having an elongated pickup arm with a stylus at one end thereof for engaging said sound groove substantially along a radius of the record as the latter is rotated, an improved mechanism for bodily guiding said arm and stylus inwardly along said record radius comprising: a fixed elongated track, an elongated second track mounted upon said first track, means for rigidly attaching said pickup arm to and transversely of said second track, means including a plurality of spaced balls interposed between said tracks for supporting said second track for movement on said fixed track along an axis parallel to said record radius to thereby cause said pickup arm and stylus to be guided inwardly along said radius, said balls being held in spaced relation solely by their rolling contact with the respective tracks, and means including a pair of elongated cam surfaces on each of said tracks and rollably engageable by said balls for yieldably resisting displacement of the second track from said axis of movement, each said pair of cam surfaces being parallel to and located respectively at opposite sides of the path of engagement of the balls with the corresponding track, whereby lateral deviation of the stylus from its mean path of travel in the sound groove is yieldably resisted.

5. In a sound reproducing system having a turntable adapted to receive a concentrically mounted record with a sound groove therein, and also having an elongated pickup arm with a stylus at one end thereof for engaging said sound groove substantially along a radius of the record as the latter is rotated, an improved mechanism for bodily guiding said arm and stylus inwardly along said record radius comprising: a fixed elongated track mounted upon said first track, means for rigidly attaching said pickup arm to and transversely of said second track, means including a plurality of spaced balls interposed between said tracks for supporting said second track for movement on said fixed track along an axis parallel to said record radius to thereby cause said pickup arm and stylus to be guided inwardly along said radius, said balls being held in spaced relation solely by their rolling contact with the respective tracks, and cam means rollably engageable by said balls upon deviation of said second track from said axis of movement for restoring the latter track to said axis, whereby lateral deviation of the stylus from its mean path of travel in the sound groove is yieldably resisted.

6. In a sound reproducing system having a turntable adapted to receive a concentrically mounted disk record with a sound groove therein, and also having an elongated pickup arm movable from a rest position laterally offset from the turntable and record, said arm having a stylus at one end thereof for engaging said sound groove substantially along a radius of the disk record as the latter is rotated, an improved mechanism for bodily guiding said pickup arm and stylus from said laterally offset rest position inwardly along said radius comprising: a fixed elongated track, an elongated second track mounted upon said fixed track in substantially parallel relation thereto and transversely of said arm, each of said tracks being laterally offset from said turntable and record and parallel to said radius, means rigidly attaching said second track to said transverse arm at a point longitudinally spaced of the latter from said stylus, means including a plurality of spaced balls interposed between said tracks for rollably supporting said second track for movement along an axis parallel to said record radius, said balls being held in spaced relation solely by their rolling contact with the respective tracks, and cam means rollably engageable by said balls upon deviation of said second track from said axis of movement for restoring the latter track to said axis, whereby lateral deviation of the stylus from its mean path of travel in the sound groove is yieldably resisted and whereby friction will be eliminated between said balls and cam means when lateral deviation of the stylus occurs.

7. Stylus guiding means according to claim 6 wherein said cam means includes a pair of elongated surfaces on each of said tracks, each said pair of surfaces being located respectively on opposite sides of and having the proximate edges thereof contiguous with the path of engagement of the balls with the corresponding track.

8. In a sound reproducing system having a turntable adapted to receive a concentrically mounted disk record with a sound groove therein, and also having an elongated pickup arm movable from a rest position laterally offset from the turntable and record, said arm having a stylus at one end thereof for engaging said sound groove substantially along a radius of the disk record, an improved mechanism for bodily guiding said pickup arm and stylus from said laterally offset rest position inwardly along said radius comprising: a fixed elongated track, an elongated second track mounted upon said fixed track in substantially parallel relation thereto and transversely of said arm, each of said tracks being parallel to said radius, means rigidly attaching said second track to said transverse arm at a point longitudinally spaced of the latter from said stylus, means including a plurality of spaced balls interposed between said tracks for rollably supporting said second track for movement along an axis parallel to said record radius, cam means rollably engageable by said balls upon deviation of said second track from said axis of movement for restoring the latter track to said axis, said balls being held in spaced relation solely by their rolling contact with the respective tracks, and means jointly carried by said tracks and operable upon the return of said arm and stylus to rest position for restoring said spacing between said balls.

9. Apparatus as defined in claim 8 wherein said space restoring means for said balls comprises a plurality of projections on said second track and located respectively in the longitudinal path of said balls as they roll in one direction, and a plurality of second projections on said fixed track and located respectively in the longitudinal path of said balls as they roll in the opposite direction, the respective first and second projections being spaced apart the same distance as the correct spacing of said balls.

References Cited in the file of this patent

UNITED STATES PATENTS

| | | |
|---|---|---|
| 2,052,506 | Volk | Aug. 25, 1936 |
| 2,869,877 | Bard | Jan. 20, 1959 |